United States Patent [19]

Casler et al.

[11] 4,276,692

[45] Jul. 7, 1981

[54] CLAMPING MEANS AND TOOL FOR MAKING IT

[75] Inventors: William A. Casler; Phillip E. Saurenman, both of Pasadena, Calif.

[73] Assignee: Clamp Manufacturing Co., Inc., South El Monte, Calif.

[21] Appl. No.: 80,546

[22] Filed: Oct. 1, 1979

Related U.S. Application Data

[60] Division of Ser. No. 913,968, Jun. 9, 1978, Pat. No. 4,181,392, which is a continuation of Ser. No. 760,696, Jan. 19, 1977, abandoned.

[51] Int. Cl.³ ............................................. B26B 25/00
[52] U.S. Cl. ....................................... 30/347; 30/178; 76/89.1; 83/663
[58] Field of Search ................. 30/329, 332, 337, 347, 30/178; 76/4, 21, 89.1, 101 B, 107 R; 83/663, 664, 666; 279/1 F, 8, 28

[56] References Cited

U.S. PATENT DOCUMENTS

| | | | |
|---|---|---|---|
| 1,963,734 | 6/1934 | Crafts | 83/663 X |
| 4,181,392 | 1/1980 | Casler et al. | 339/95 R |

*Primary Examiner*—Jimmy C. Peters

*Attorney, Agent, or Firm*—Donald D. Mon

[57] ABSTRACT

Clamp capable of mechanical clamping and optionally useful for providing especially high electrical conductivity having a pair of juxtaposed clamping jaws for gripping an object. One important use of the clamp is to grip an article through which high current is required to flow as, for example, in electric welding. At least one of the jaw blocks is of deep case-hardened cold rolled steel, and when used for high electrical conductivity, is copper coated. The face of this block is provided with concentric teeth which bite into the article. The outer faces of the teeth are perpendicular to the surface of the article being gripped. This inhibits skidding of the clamp and also provides good electrical contact where needed, even in the presence of rust or corrosion. The circular shape of teeth permits rotation or oscillation of the clamp during the clamping operation, which facilitates cleaning of the engaged surfaces and enhances electrical conductivity. Such a low resistance electrical connection permits high current flow with relatively little power loss. In a form of the clamp there are a plurality of sets of concentric teeth, with teeth of one set intersecting teeth of another set. The teeth for the jaw block can be cut by a cutter in a tool holder which is adapted for rotation.

9 Claims, 18 Drawing Figures

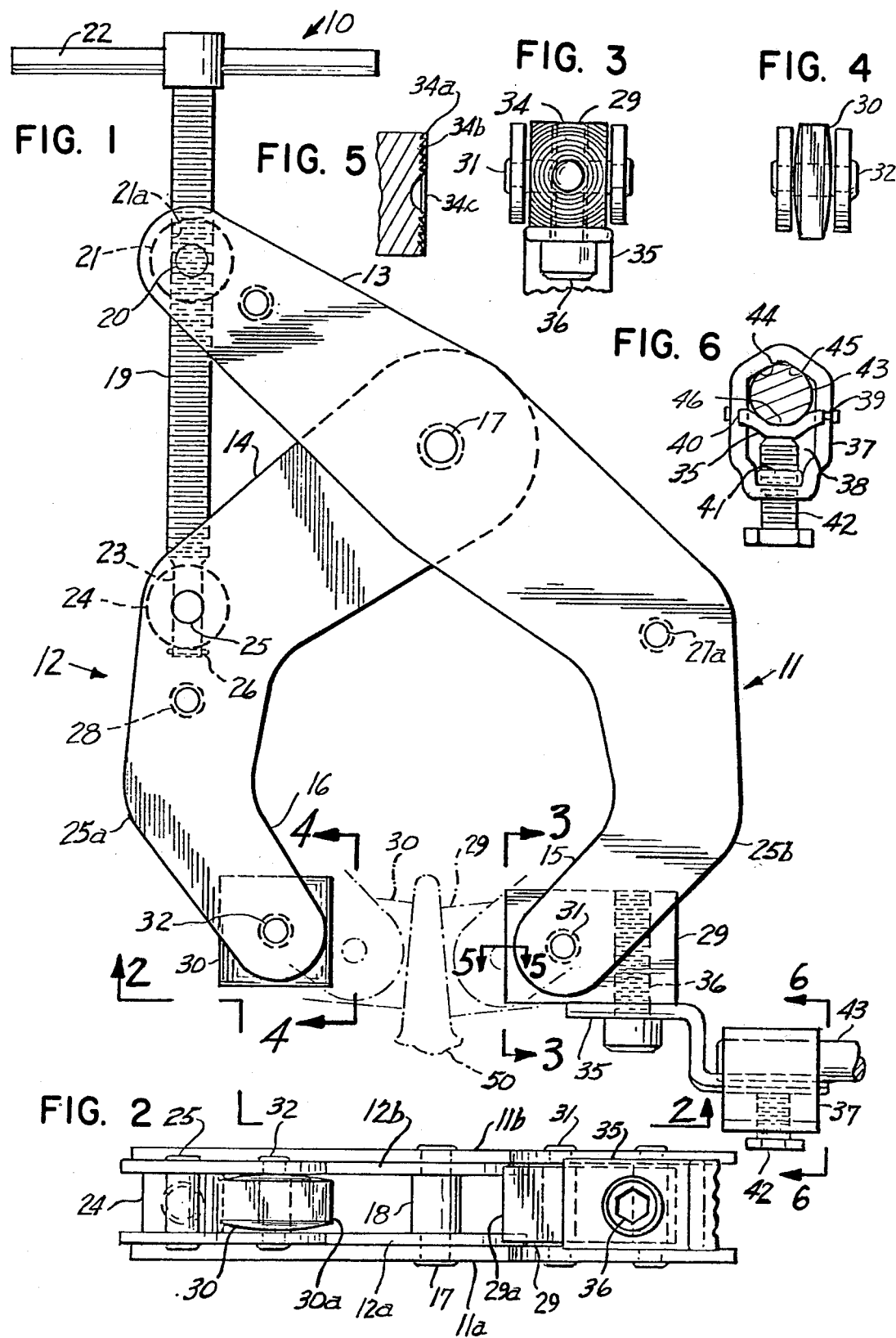

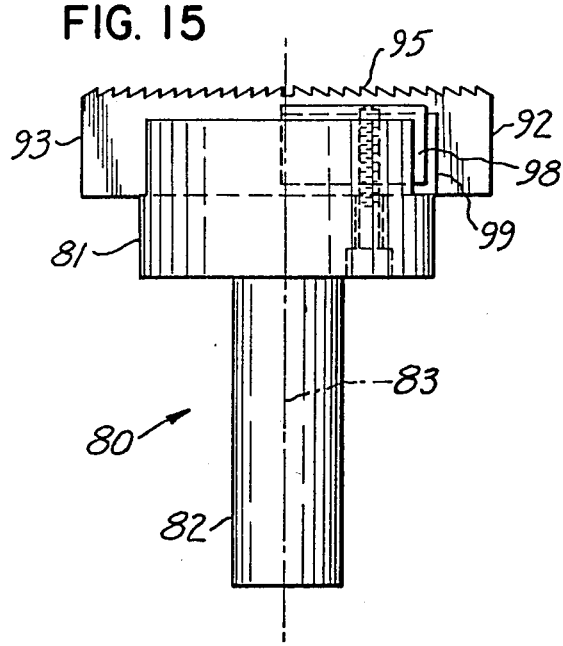
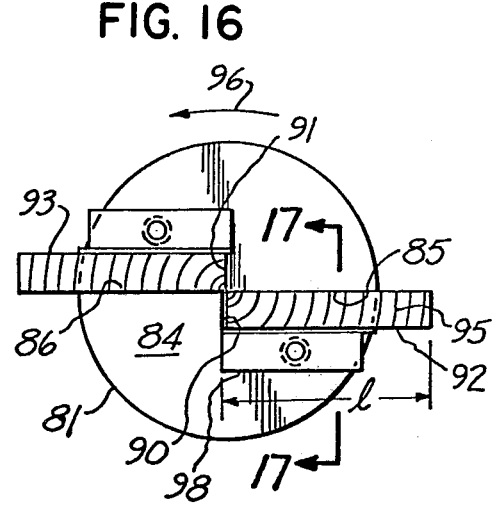
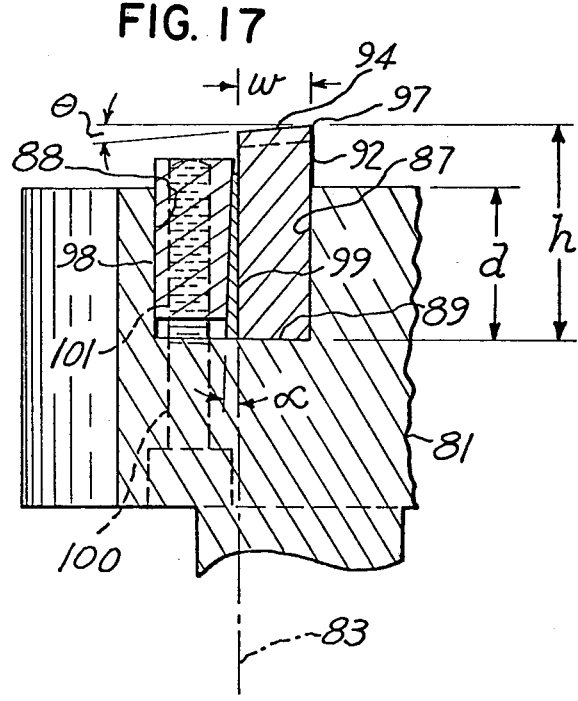
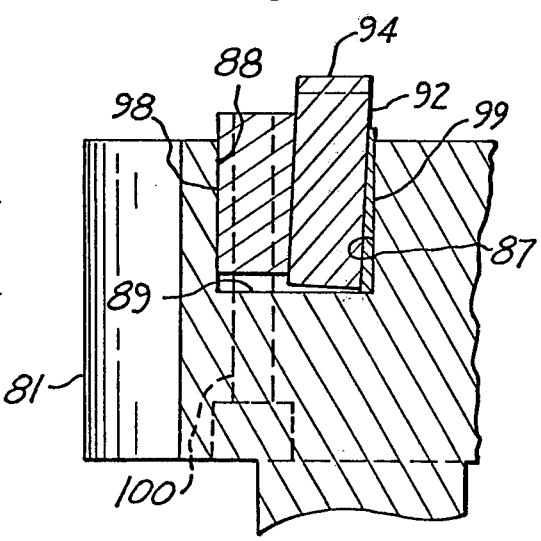

CLAMPING MEANS AND TOOL FOR MAKING IT

CROSS REFERENCE TO CO-PENDING APPLICATION

This is a division of applicant's co-pending U.S. patent application, Ser. No. 913,968, filed June 9, 1978, now U.S. Pat. No. 4,181,392, issued Jan. 1, 1980, which in turn is a continuation of Ser. No. 760,696, filed Jan. 19, 1977, now abandoned.

This invention relates to clamps useful for mechanical clamping or the making of good electrical connections, or both.

Mechanical clamping devices have long been known. However, problems have heretofore been encountered. For example, undesirable skidding on the object being clamped has been experienced. Furthermore, where heavy currents are to be carried through the clamped connection there has heretofore been a substantial power loss at the clamped connection due to the local resistance at the connection. Surface effects such as corrosion, rust, paint, or the like have been a factor in preventing significant reduction of such undesirable high power loss.

There have heretofore been used clamping surfaces provided with serrations or knurling for the purpose of providing a surface roughness to resist skidding which would tend to occur in case of a smooth clamping surface. Serrated surfaces are those such as are made by intersecting straight cross cuts across the surface which result in pyramid points throughout the surface area. A knurled surface is a surface made by rolling-on surface irregularities in the form of rounded bumps throughout the surface area. Such serrated or knurled clamp surfaces have not reduced sliding or skidding to a degree which is often desired, and furthermore they have not always been effective in providing low resistance electrical connection where high currents are to be carried.

Another expedient heretofore proposed has been to provide serrations in the form of minor concentric arcs. These, however, do not lend themselves to electrical connections. Neither do they effectively resist rotation or sliding in all directions. Moreover, these as well as other known serrated surfaces require comparatively expensive fabrication techniques.

An object of this invention is to provide a mechanical clamping means which does not readily rotate, slide or skid.

Another object of this invention is to provide a penetrating and electrically conducting surface for a clamp connection means wherein the electrical power loss commonly experienced is substantially reduced.

A related object is to establish effective, rapid clamping through coatings such as rust, paint or corrosion.

The invention is carried out by means of a clamp having a pair of clamping jaws which can be brought toward each other by manipulation of the clamp and a block pivoted on each jaw, each block having a face which can be juxtaposed to the face of the other block.

In one aspect of the invention a juxtaposed face of a block is provided with protruding teeth which are in the form of substantially complete concentric circles.

In another aspect of the invention a face of a block is provided with a plurality of sets of teeth which are in the form of at least partial circles concentric with each other, the centers of concentricity of the different sets being spaced from each other at positions so that the teeth of each set are intersected by the teeth of another set.

A feature resides in the provision at a juxtaposed face, of teeth provided with cutting edges capable of digging or biting into an object being clamped.

A related feature resides in the circular shape of the teeth.

A desirable feature resides in the outer faces of the circular teeth being more perpendicular to the plane of the cutting edges of the teeth than are the inner faces, which is an important factor in providing the desired non-skid effect of the clamp.

Another desirable feature of the invention resides in the use of a hardened material for the block, particularly at the said juxtaposed face of the block. Where the clamp is to be used for making electrical contact, at least one of these blocks is preferably made of electrically conductive metal.

In a preferred form the conductive block used for making an electrical connection is of copper-coated, case-hardened, cold-rolled steel. The effect of the teeth is to provide assured metal-to-metal contact under great unit pressures, and to cut through any rust, paint or corrosion which may be present.

A related embodiment of the invention resides in a tool for cutting the circular teeth in the blocks. This involves the use of cutter inserts in a tool holder which can be rotated to cut the teeth, and which can also be adapted to form relieved cutting edges in the cutter inserts prior to hardening.

The foregoing and other features of the invention will be better understood from the following detailed description and the accompanying drawings in which:

FIG. 1 is a face view of a clamp according to this invention;

FIG. 2 is an end view of the clamp of FIG. 1 looking from line 2—2 of FIG. 1;

FIG. 3 illustrates a detail looking from line 3—3 of FIG. 1;

FIG. 4 illustrates a detail looking from line 4—4 of FIG. 1;

Figure 7:
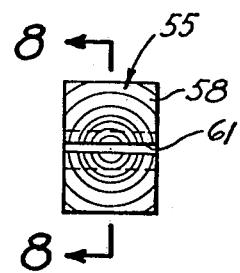
Figure 8:
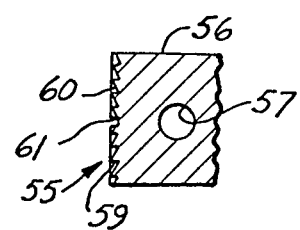
Figure 9:
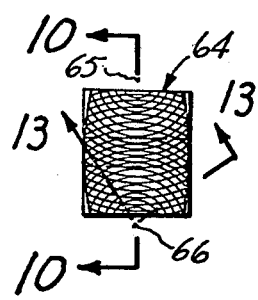
Figure 10:
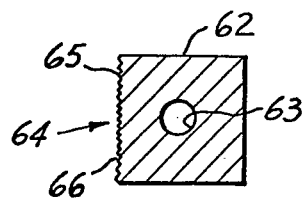
Figure 11:
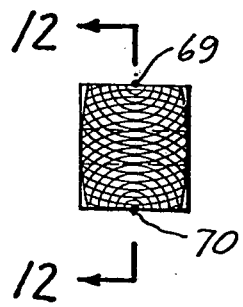
Figure 12:
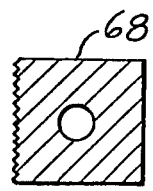
Figure 14:
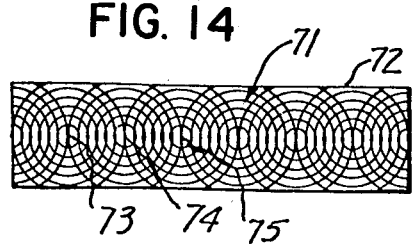
Figure 13:
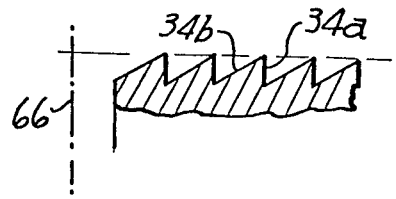

FIG. 5 shown a detail in cross section taken at line 5—5 of FIG. 1;

FIG. 6 shows a detail in cross section taken at line 6—6 of FIG. 1;

FIG. 7 shows the clamping face of a modified form of a clamp block according to this invention which may be used alternatively to that illustrated in FIG. 3;

FIG. 8 shows a detail in cross-section taken at line 8—8 of FIG. 7;

FIG. 9 shows the clamping face of another modified form of block according to this invention which may be used alternatively to that shown in FIG. 3;

FIG. 10 shows a detail in cross-section taken at line 10—10 of FIG. 9;

FIG. 11 shows the clamping face of still another modification of a clamp block according to this invention which may be used alternatively to that shown in FIG. 3;

FIG. 12 shows a detail in cross-section taken at line 12—12 of FIG. 11;

FIG. 13 shows a detail in cross-section taken at line 13—13 of FIG. 9;

FIG. 14 shows the clamping face of another clamp member according to this invention;

FIG. 15 is an elevation view of a tool holder containing a tool according to this invention useful for cutting teeth in blocks which are in accordance with this invention;

FIG. 16 is a plan view of the tool and tool holder shown in FIG. 15;

FIG. 17 is a cross-section view showing a detail taken at line 17—17 of FIG. 16; and FIG. 18 is a cross-section view illustrating the cutting of teeth of the tool of FIGS. 15 to 17.

Referring to FIGS. 1 and 2 there is shown a clamp 10 of the general type shown in Saxton U.S. Pat. No. 2,726,694. The clamp comprises a pair of members 11 and 12 of which portions 13 and 14 constitute arm portions and portions 15 and 16 constitute jaw portions associated and integral with respective arm portions 13 and 14. Each member 11 and 12 is formed of two spaced strips 11a, 11b and 12a, 12b, respectively, of identical form and maintained in substantial parallelism, as indicated in FIG. 2. The pair of parts 12a and 12b, constituting the member 12 is secured by a pin 17 at its outer end, between the parts 11a and 11b of the arm 13, and intermediate the ends of said arm 13.

The pin 17 is formed with an enlarged central portion 18 which acts as a spacer between parts 12a and 12b. The jaw portions 15 and 16 are substantially at a right angle to the respective arm portions 13 and 14, although the angle may be somewhat different from 90 degrees. The arm and jaw portions of the two members 11 and 12 form a bight at the jaw side of the pin 17, and the links of the two portions 15 and 16 are substantially the same, and the links of the two arm portions which lie between the pin 17 and the respective apices at 25a and 25b with the jaw portions are the same. A pin 20 located at the outer end of arm 13 is formed with an enlarged central portion 21, which acts as a spacer between parts 11a and 11b. The portion 21 is provided with a threaded bore 21a perpendicular to the axis of pin 20 which is rotatable within parts 11a and 11b.

An elongated thrust screw 19 is passed through the threaded bore of rotatable pin 20 which acts as a trunnion nut. The outer end of the thrust screw 19 is provided with a handle 22 for turning it, and the opposite end of this screw is narrowed down to a reduced and unthreaded diameter at 23 where it passes through a hole with a rotatable spacer 24 formed on a pin 25 rotatably passing through respective members 12a and 12b at the apex of portions 14 and 16. At the extreme end of screw 19 there is fixed a collar 26 which retains the reduced portion 23 within the spacer 24. The ends of pins 17, 20 and 25 are riveted at both ends so as to retain the members 11a, 11b, 12a and 12b. An additional spacer 27a, ordinarily non-rotatably pinned to members 11a and 11b, and a similar spacer 28 similarly pinned to members 12a and 12b are provided for added rigidity of the device, and their pins are likewise riveted over at their ends.

The inner ends of jaws 15 and 16 are provided with respective jaw blocks 29 and 30, jaw block 29 being positioned between parts 11a and 11b to which it is rotatably pinned by a pin 31 and jaw block 30 being positioned between parts 12a and 12b to which it is rotatably pinned by a pin 32. Jaw block 29 may be used for mechanical clamping either with, or without, the need for making a low-resistance electrical connection. Assuming that it is for use in making a good electrical connection, jaw block 29 is in the form of an electrically conductive block of a hard material. The body of jaw block 29 is preferably of a cold-rolled steel with deep case hardening for hardness and copper-coated for good electrical conductivity. Jaw block 30 may be similarly made if desired. The blocks 29 and 30 are provided with respective faces 29a and 30a and the blocks may be pivoted to cause these faces to be juxtaposed to each other. The juxtaposed face 30a of block 30 is planar and the juxtaposed face 29a of block 29 is provided with concentric circular teeth 34 as best seen in FIGS. 3 and 5.

Each of the concentric circular teeth 34 has an outer face 34a which is substantially perpendicular, and an inner face 34b which is oblique, with respect to the general plane 34c of the peaks or cutting edges of the teeth. This structure of the teeth wherein the outer tooth faces are substantially perpendicular and the inner tooth faces are oblique, that is, conical, performs a unique function in enhancing the anti-skid property of the block. This is for the reason that any tendency for the block to slide in any radially outward direction from the center of the concentric circles tends to produce a rotation of the block, even though slight, in the direction which makes the parts of the teeth located along this radius to dig in or bind against the object being clamped. In other words the leading teeth edges dig in. Referring, for example, to the upper portions of the teeth appearing above the center of the block in FIGS. 3 and 5, these upper tooth portions will have a greater resistance to sliding or skidding on a workpiece in an upward direction of movement of the block than in the downward direction. But the tooth portions beneath the center of the block in FIGS. 3 and 5 will present greater resistance to sliding in a downward direction of movement of the block than in the upward direction. That is to say, the more perpendicular outer faces of the teeth present greater resistance to skidding than do the more oblique inner faces. This characteristic is also true in respect to any tendency to lateral skidding motion of the block on a workpiece. Hence the tooth formation of a perpendicular outer face and an oblique inner face is very effective in inhibiting skidding in any direction. The tooth formation will still be effective for this purpose even when the outer tooth faces differ from the perpendicular. The effectiveness is better, however, when the outer faces are more perpendicular than the inner faces. There is effectiveness, although to a lesser degree, even when the outer faces have a degree of obliqueness the same or approximating, the degree of obliqueness of the inner faces.

The under side of block 29 (when the circular patterned face 29a is juxtaposed to block 30) has attached to it a strip or bar 35 by means of a bolt 36. The bar 35 is electrically conductive and may be of copper or copper-coated steel or the like. There is placed over the end of bar 35 opposite the end connected with block 29 a bracket 37 in the form of an enclosure having through it an opening 38 through which the end of the bar extends. To prevent the bracket from falling off the bar when the bracket is not tightened, the two sides 39 and 40 at the end of the bar are upset to extend outwardly against the outer end of the bracket. The bracket has a threaded hole 41 through which there is threaded a bolt 42 the end of which is adapted to bear against the bar 35 to force the bar against a electrical conductor 43 which is to be connected with the bar such that the conductor is bound between inner faces 44 and 45 of the bracket and the bar itself. The bar is provided at this place with a central dip 46 to better engage the wall of the conductor 43. It will be understood that the use of bar 35 and bracket 37 represents only one of many ways by which a conductor 43 may be attached to the block 29. The conductor may, if desired, be attached directly to the block.

The clamp connector of FIGS. 1 and 2 is especially useful for establishing an electrically conductive connection to a piece of equipment where there is a relatively heavy current to be carried, or an assured low resistance connection is needed through insulating coatings or contaminants. A typical example is in the use of electrical welding equipment for making a weld to a metallic article. In such cases it is a common practice to establish a ground connection from the welding equipment to the article on which the weld is to be made. The ungrounded conductor of the electrical line is brought to the welding point which is used to draw an arc from the proper point of the metallic article to the welding point. In using the clamp connector, a convenient part of the metallic article on which the weld is to be made will be clamped between the blocks 29 and 30 as indicated in phantom in FIG. 1 which shows a convenient part or edge 50 which has been clamped between the blocks 29 and 30 now brought together into clamping engagement with the article 50 by turning of the clamp screw 19. The circular tooth pattern 34 on the face of block 29 will bite into the surface of the article 50 which is ordinarily of a softer metal than the case-hardened teeth of the block. In applying the clamp of FIGS. 1 and 2 to a member 50 it will usually be preferable to oscillate the clamp while tightening it so that the circular teeth rotate back and forth through an angle about their center. This will enhance the cutting action of the sharp teeth into the material of the article 50 and will facilitate the teeth cutting through surface material such as paint, rust, corrosion or contaminant which may be present at the surface of the article 50. The faces of the teeth thus come cleanly into contact with a substantial area of electrically conductive material of the article 50, resulting in a good low resistance electrical connection. Since the planar surface 30a of block 30 has no teeth, it does not inhibit the oscillatory rotation of the clamp while tightening. In the last stages of tightening of the clamp the oscillatory motion will usually be discontinued so that any further biting of the teeth into the article will tend to inhibit the tendency for the clamp to rotate or oscillate relative to the article when completely tightened. The teeth will serve the several functions of preventing skidding and of biting through any rust, paint or corrosion on the article and also of presenting a substantial area of surface of the block against the article 50, thereby enhancing the electrical conductivity.

A clamp of the type shown in FIGS. 1 to 6 has carried a current of three hundred amperes between the conductor 43 and the article 50 with a power loss of only 7 watts. This compares with measured losses of over 30 watts experienced in the use of prior known conventional clamp connectors carrying the same amount of current through relatively clean surfaces. If such surfaces had not been clean, the power losses involved in the use of the prior known conventional connectors would have been much greater. But with the use of a clamp connector according to this invention, the power loss is very much smaller even if the surface of the clamped article is covered by a coating or contaminant because such coating is easily penetrated by the circular toothed clamp surface.

Although the clamping block of FIGS. 3 and 6 has been described with particular reference to its use as a low-resistance electrical connector, it will be understood that it is also useful as a skid-resistant mechanical clamping member either with or without use as an electrical connector.

FIGS. 7 and 8 illustrate the clamping face 55 of a block 56 which may be used in lieu of the block 29 of FIG. 1. This block is similar in shape to block 29 and is provided with a hole 57 similar to the hole through block 29, which receives the pin 31. The clamping face is provided with circular teeth 58, the center faces 59 of which are perpendicular and the inner faces 60 oblique to the plane of the tooth-cutting edges, as in the case of the teeth shown in FIGS. 3 and 5. A difference from the circular-toothed face of the block shown in FIGS. 3 and 5 is that in the block of FIGS. 7 and 8 there is provided a narrow notch 61 extending diametrically across the concentric circles from one side of the block to the other at the clamping face, as deep as the depth of the teeth. The concentric circles are substantially complete circles in spite of the presence of the narrow notch. The block of FIGS. 7 and 8, like that of FIGS. 3 and 5, is useful for a mechanical clamping action either with or without use as an electrical connector. When used as an electrical connector it is preferably copper coated in the same manner described in connection with block 29. The block 56 is usable in the same manner as block 29, and for establishing good electrical contact it is desirable to oscillate the block about the center of the concentric teeth for effective cutting which will occur even in the presence of paint, corrosion or rust, or the like, and for establishing substantial conductive contact. The presence of the notch 61 adds cutting edges and facilitates the cleaning out of the cut material from between the teeth, thereby enhancing the cutting action and the quality of the electrical contact.

FIGS. 9 and 10 illustrate a block 62 usable in lieu of the block 29 of FIGS. 1 through 5. This block is of the same shape as the block 29 and adapted to be fitted to the clamp by passing the pin through the hole 63. The clamping face 64 of block 62 differs from the clamping faces of blocks 29 and 56 in having two sets of concentric circular teeth instead of only one set. The concentric teeth of one of the sets are centered at a position 65 above the top of the block. The concentric teeth of the other set are centered at a position 66 below the bottom of the block. The faces of the teeth remote from the respective centers are substantially perpendicular to the plane of the cutting edges of the teeth and the faces of the teeth closest to the respective centers are oblique to the plane of the cutting edges of the teeth. The teeth of the two sets cross each other, as best seen in FIG. 9. The shape of the teeth of the lower set centered at position 66, taken along a radial line 13—13 of these teeth, in FIG. 9, appears as shown in FIG. 13 when the effect of the presence of teeth of the other set is ignored. FIG. 13 illustrates the shape of the teeth when the lower set is cut during manufacture into the face of the block prior to the cutting of the upper set of teeth into the block. It is understood that the upper set of teeth will have the same shape along a radial line when the effect of the lower set of teeth is ignored.

The block having the face shown in FIGS. 9 and 10 is useful for mechanical clamping and has the desirable attribute of being particularly resistant to rotation, in addition to its resistance to sliding or skidding relative to the object being clamped. Although it can be used to establish electrical contact, it does not have the benefit of being as readily oscillatable or rotatable as in the case of blocks 29 and 56. Hence, where penetration of rust, paint or corrosion, or the like with minimum effort is involved, it may generally be preferred to use a rotatable type such as blocks 29 and 56 when a good electrical connection is desired.

FIGS. 11 and 12 illustrate a block which is very similar to that of FIGS. 9 and 10. A slight difference from FIGS. 9 and 10 resides in the fact that the positions 69 and 70 of the centers of the concentric teeth of the two sets of teeth are located at the top and bottom respectively of the block. Otherwise the shapes of the teeth are similar to those of FIGS. 9 and 10. The block 68 is useful for mechanical and electrical clamping to the same extent as stated for block 62.

The plural sets of circular teeth shown on the face 64 of block 62 and on the face of block 68 comprise two such sets on each block. It will be understood, however, that such plural sets of circular teeth may comprise more than two sets. FIG. 14, for example, illustrates the face of a clamping block or member having more than two sets of crossing circular teeth. These sets are formed on centers at positions 73, 74, 75 and the like. The teeth are constructed the same as in FIGS. 9 and 11, and the teeth of adjacent sets cross each other in the same way. The member of FIG. 14 may be used as a jaw block in the clamp of FIGS. 1 and 2, or may be used as the clamping jaw of a vice or the like. When used in the clamp of FIGS. 1 and 2, it will be provided with a hole such as hole 63 of FIG. 10, to receive the clamp pin.

FIGS. 15, 16 and 17 show a tool by which circular teeth in accordance with this invention may be formed. There is shown a tool holder 80 having a cylindrical body 81 from which there extends a cylindrical stem 82 of lesser diameter than the body and concentric therewith. The stem 82 is adapted to be fitted to a mill for turning on the axis of rotation 83. Two grooves 85 and 86 are formed into the planar forward face 84 of the tool from opposite sides of body 81. Groove 85, illustrated in detail in FIG. 17, has two parallel sides 87 and 88 spaced apart and paralel to the central axis of rotation 83. The bottoms of the two sides 87 and 88 are joined by a flat base 89 perpendicular to the axis of rotation. Side 87 includes axis 83 and hence is longer than side 88 which is away from the axis. The grooves 85 and 86 have respective end walls 90 and 91 which are somewhat offset from each other, the end wall 90 being slightly closer to the cylindrical wall opposite that of the groove entrance, and the end wall 91 also being somewhat closer to the opposite side of cylindrical body 81 than to the entrance of this groove. Groove 86 is identical with groove 85 in its dimensions and the long side of groove 86 is co-planar with the long side of groove 85, which in FIG. 17 has the number 87. The plane of these long sides extends along a diameter of the cylindrical body 81 and includes the axis 83.

Groove 85 has fitted into it a cutter 92 and groove 86 had fitted into it a cutter 93. These two cutters are identical, hence the description of cutter 92 will suffice to explain the construction of both cutters. Cutter 92 is made from a wafer which is rectangular in cross section except for a rake angle at its upper edge 94 as is explained hereafter. It has a length l and a width w, and its height h is substantially greater than the depth d of groove 85 so that the upper edge 94 is above the face 84 of the tool holder. The upper edge 94 has teeth 95 fromed into it of the same configuration and dimensions as the teeth to be cut into a jaw block, for example the teeth 34 of jaw block 29 or the teeth of jaw blocks 55, 64 or 72 or the like. As shown in FIG. 17 the edge 94 containing these teeth is formed with a rake angle $\theta$ which typically may be from about 4 degrees to 8 degrees with the result that the leading edges 97 of the teeth relative to the direction of rotation indicated by arrow 96 (FIG. 16) are higher than the remainder of the teeth relative to a plane which is horizontal with reference to FIGS. 15, 17 and 18.

The cutter 92 is firmly held in position against groove edge 87 and base 89 by means of a tapered clamping wedge 98 and a tapered shim 99. The taper angle $\alpha$ of the shim and of the wedge may conveniently by in the range of about 4 degrees to 8 degrees. The cutter is securely retained in this position by the turning of a screw 100 having its head at the bottom of body 81 and having its shank passed upward through a hole through the body which communicates with groove 85 and has its threaded end threaded into an internally threaded hole 101 through the wedge 99. It is seen that since the bottom 102 of the wedge is at some distance from the base 89 of the groove, the turning of the screw pulls the wedge downward and applies pressure through the shim against the adjacent side of cutter 92.

Since the grooves 85 and 86 are identical in their dimensions and the cutters 92 and 93 are identical in their dimensions their respective leading edges 92 which are the highest parts of the teeth will be aligned in the plane of groove sides 85 and 86 and all these leading edges will be at the same height. Thus when the face of a clamp block which is to have circular teeth cut into it is placed so that the teeth of the cutter are brought against the face of the block, the teeth will be cut into the block by turning of the tool in a lathe on its axis 83 in the direction of arrow 96. These teeth thus cut will have the configuration of the cutter teeth, except that the teeth cut into the block will not have the rake of the cutter teeth. As seen in FIG. 15 each cutter tooth has a face which is perpendicular to the plane of the teeth and a second face oblique to the plane of the teeth. Thus, these teeth will cut into the block, teeth of the shape shown in FIGS. 3, 5, and 7. Also, teeth like those of FIGS. 9, 11 and 14 are readily cut by appropriate positioning of the cutter tool in relation to the block face wherein the teeth are to be cut.

FIG. 18 illustrates how cutter inserts such as cutter insert 92 may be made by use of the same tool holder 80. For this purpose there is used a wafer blank 105 of unhardened metal of the same dimensions as the cutter 92 except that the wafer 105 does not yet have teeth cut into it. Hence it has a rectangular cross-section except for the rake angle $\theta$ which it already has when inseerted in the tool holder. For the purpose of making the upper end of the wafer horizontal the wedge 99 is inserted between groove wall 87 and the adjacent wall of the wafer. This will cause the wafer to tilt relative to the groove such that the tapered side of the wedge 98 coincides with the adjacent wall of the wafer. The tightening of the screw 100 will cause the wafer to be firmly held in the groove with this tilt which will be such that the upper edge having the rake will become horizontal. This horizontal position of the upper edge will conform with the requirement for cutting the teeth 95 across it by a well-known tooth cutting operation. After all of the teeth have been cut in the wafer, the wafer will be hardened, ready for use as a cutter for cutting teeth in clamp blocks. To do this the position of the wedge 99 is shifted to that shown in FIG. 17 thereby making the tool ready for cutting circular teeth in clamp blocks.

It will be understood that practice of the invention does not require the particular clamping structure shown in FIGS. 1 and 2. Some other type of clamp, for example a vice, capable of applying the required pressure to the blocks to force the block provided with the teeth to bite into an article may be used.

This invention is not to be limited by the embodiments shown in the drawing and described in the description, which is given by way of example and not of limitation, but only in accordance with the scope of the appended claims, for example the tool for cutting circular patterns in metal for other hard materials can also be used to cut the anti-skid teeth in circular or other pedestal pads. Also this rotary cutting tool system will be useful for cutting spherical, or concentric circular contours other than teeth.

We claim:

1. A device for cutting circular teeth into a face of an article comprising:
   (a) a rotatable body having an axis of rotation;
   (b) a face adapted to be juxtaposed to the face of the article;
   (c) a groove in said face of the body;
      (i) said groove having parallel sides spaced from each other;
   (d) a cutter insert in the groove,
      (i) said insert protruding outwardly from said body to an edge face;
      (ii) said edge faces containing arcs of circular teeth for engaging said block face to cut teeth therein;
      (iii) said arcs of circular teeth having leading edges which protrude further outwardly from said body face than the remainder portions of said teeth, thereby creating a rake at the teeth by which the cutting of teeth into the block face is performed by said leading edges.

2. A device according to claim 1 including at least another groove having therein a cutter insert protruding outwardly from said body to an edge face containing arcs of circular teeth, and having parallel sides spaced from each other.

3. A device according to claim 2 in which the number of said grooves containing cutter inserts is two.

4. A device according to claim 1 including wedge means for holding said cutter inserts against a side of the respective groove.

5. A device according to claim 4 which includes a removable wedge-shaped shim between each wedge means and cutter insert, whereby the shim can be moved to a position between the cutter insert and the side of the groove for the purpose of making concentric shapes in unhardened cutter inserts.

6. A device according to claim 5 in which each wedge means comprises a wedge having an edge spaced from the base of the groove, and means urging the wedge toward the base of the groove.

7. A device according to claim 6 in which said leading edges lie along a straight line through, and perpendicular to, the axis of rotation.

8. A device according to claim 7 in which each of the circular tooth arcs has a face remote from the axis of rotation and a face closer to the axis of rotation than the remote face, said closer face being substantially parallel to the axis of rotation, and said remote face being oblique to the axis of rotation.

9. A device according to claim 1 in which the cutter inserts are removable.

* * * * *